(12) United States Patent
Holmes et al.

(10) Patent No.: US 6,788,202 B2
(45) Date of Patent: Sep. 7, 2004

(54) CUSTOMER CONVERSION SYSTEM

(75) Inventors: Jon A. Holmes, Eden Prairie, MN (US); Steven P. May, North Grafton, MA (US); Timothy J. Casey, Kensington, NH (US)

(73) Assignee: LP Innovations, Inc., Canton, MA (US)

( * ) Notice: Subject to any disclaimer, the term of this patent is extended or adjusted under 35 U.S.C. 154(b) by 0 days.

(21) Appl. No.: 09/850,485

(22) Filed: May 7, 2001

(65) Prior Publication Data

US 2002/0190858 A1 Dec. 19, 2002

(51) Int. Cl.$^7$ .............................................. G08B 13/00
(52) U.S. Cl. .................. 340/541; 340/539; 340/825.65; 340/556; 340/870.01; 705/10; 705/11
(58) Field of Search ................................. 340/541, 539, 340/825.36, 870.01, 870.02, 825.65, 825.68, 825.83, 825.87, 555, 556; 705/10, 11; 377/6, 37, 45, 20

(56) References Cited

U.S. PATENT DOCUMENTS

| | | | |
|---|---|---|---|
| 3,727,034 A | * 4/1973 | Pope | 377/6 |
| 3,808,410 A | * 4/1974 | Schlesinger | 705/10 |
| 4,285,483 A | * 8/1981 | Cipollone | 377/20 |
| 4,700,295 A | * 10/1987 | Katsof et al. | 705/10 |
| 4,799,243 A | * 1/1989 | Zepke | 377/6 |
| 4,831,638 A | * 5/1989 | Dabby et al. | 377/6 |
| 5,250,941 A | * 10/1993 | McGregor et al. | 340/825.66 |

OTHER PUBLICATIONS

St. Michael Strategies, St. Michael Strategies Traffic Counter Rental Program, www.storetraffic.com, 1999.
St. Michael Strategies, Partial Client List, www.storetraffic.com, 1999.
Bunyar, Michael, "Choosing the Right Motion Detectors", Aug. 1998, p. 1–15.
Bunyar, Michael, "Consider 20% . . . ", Aug. 1998, p. 1–7.
Bunyar, Michael, "What's in a Traffic Counter?", Sep. 1998, p. 1–7.
RCT's The People Counter, web page Apr. 17, 2000.
Unknown, "Ratio Realities", St. Michael Strategies, Sep. 1999, vol. 1, No. 4.
ShopperTrak website, www.shoppertrak.com, Dec. 1, 2000.
Prodco Technology website, www.prodcotech.com, Dec. 1, 2000.
Prodco Technology website, "Customer Counting for Accurate Retailing", www.producotech.com, Dec. 1, 2000.
A1–Service Group website, "Welcome to A1–Servicegroup.com", www.al–servicegroup.com, 1997.
Traf–Sys website, "Traf–Sys Pedestrian Traffic Counting System", www.trafsys.com, Dec. 1, 2000.
Shoptron website, "CAS Visitor Counters", www.shoptron.de, Dec. 1, 2000.
Holydis website, Affluence, "Customer Counting and Entry Flow Analysis", www.holydis.com, Dec. 1, 2000.
Elmech Co., Q–Scan Electronic People Counters website, members.aol.com/qscan1, 2000.
Bunyar–Malenfant International, BMI website, www.b-mi.ca, 1997.
Solvatronics, Solva website, www.solva.nl, 2000.

* cited by examiner

Primary Examiner—Jeffery Mofsass
Assistant Examiner—Daniel Previl
(74) Attorney, Agent, or Firm—Wolf, Greenfield & Sacks, P.C.

(57) ABSTRACT

A customer conversion system connects existing, conventional sensors to a point of sale computer or other computer. Entries by people into a retail space so equipped are counted and recorded on a continuous or on a periodic interval basis.

22 Claims, 6 Drawing Sheets

CUSTOMER CONVERSION SYSTEM

BACKGROUND

1. Field of the Invention

The present invention relates to methods and apparatus, which perform customer counting in the retail environment.

2. Related Art

Several technologies exist for counting customers in the retail environment. One objective of such systems is to determine the customer conversion rate in a particular environment. Customer conversion rate is the ratio of the number of customers who enter the environment, i.e., the amount of traffic in a location, to the number of sales or to the dollar value of the sales in the particular environment. Computing customer conversion ratios in a quick and accurate fashion is important to retailers desiring to evaluate and improve their retail environments.

In order to compute customer conversion ratios, information must be obtained from two, usually independent, sources. Customer counts must be obtained from some sort of manual or automatic, direct or indirect observation of traffic. Numbers or values of sales must be obtained, usually from point of sale computers or terminals, or central sales logging computers, or the like.

One method of counting customers is to observe a retail environment with video equipment. The images obtained therefrom can be processed to determine the number of customers who move through an area in a given period of time. Such systems are complex and require expensive installation by skilled technicians for proper operation.

Another method of counting customers is to incorporate a tag device into an article like a shopping cart, which is then detected when the customer moves the cart past a suitable sensor. Again, the system and tagged carts are expensive and require installation by skilled technicians for proper operation.

Yet another method of counting customers involves deploying sensors in locations to be monitored. McGregor et al. disclose such a system in U.S. Pat. No. 5,250,941-B1. Simple sensors, such as pressure sensitive strips, carpeting and the like, ultrasonic, infrared, and other presence or movement detectors can be used. A principle disadvantage of such deployments of sensors is simply the expense and inconvenience of having to install and maintain them throughout the areas to be monitored. Another disadvantage is that such sensors can be fooled into undercounting or overcounting traffic depending on the exact pattern of traffic and sensor characteristics.

SUMMARY OF THE INVENTION

It is a general object of the invention to provide an improved customer counting system in a retail environment.

According to one aspect of the invention, there is a customer conversion system, comprising a data processing unit including a real-time clock and an input, a sensor having an output indicative of each activation of the sensor, and an interface unit connecting the output of the sensor to the input of the data processing unit. In one variation, this system may include a security system to which the sensor output is connected. In another variation, the system may include a software program executing on the data processing unit which performs receiving the output of the sensor from the interface unit, and storing a record of the output of the sensor together with a time-stamp based on the real-time clock. In yet another variation, the system may include another sensor having an output indicative of each activation of the other sensor, another interface unit connecting the output of the other sensor to the input of the data processing unit, and a multiplexer through which the interface unit and the other interface unit connect the output of the sensor and the output of the other sensor to the input of the data processing unit.

According to another aspect of the invention, in a retail store including a security system having sensors which detect entry of a person and a point of sale computer including a real-time clock, a customer conversion system may include an interface unit connecting the sensor from the security system to the point of sale computer, and a software program executing on the point of sale computer which receives a signal indicating entry of a person from the sensor through the interface unit, and stores a record of receipt of the signal together with a time-stamp indicating when the signal was received.

BRIEF DESCRIPTION OF THE DRAWINGS

In the drawings, in which like reference designations indicate like elements.

DETAILED DESCRIPTION

The present invention will be better understood upon reading the following detailed description of a number of embodiments and aspects thereof, in conjunction with the drawings.

The invention is illustrated herein by the description of several embodiments thereof in Customer Conversion Systems (CCSs). One exemplary CCS is a system comprised of a combination including off the shelf components and new components illustrated by the block diagram of FIG. 1, described below. A CCS system 100 may include:

- a Point of Sale (POS) computer or other computer 101 including a real-time clock (RTC);
- a CCS Sensor Interface Unit 102; and
- one or more activity sensors 103.

The CCS Sensor Interface Unit 102 may require its own power supply 104, as well.

The exemplary system counts customers at a lower cost than other, currently available methods. Lower cost in the exemplary system is accomplished in part through a low cost interface to existing or inexpensive conventional sensors 103, such as existing or conventional door alarm sensors, and in part through simple installation. The cost of the CCS Sensor Interface Unit 102 is kept low by using a single chip microcontroller and excluding a real time clock. The exemplary system 100 takes advantage of the real time clock that is already in the POS computer or other computer 101. The installation is made simpler and quicker by using intelligent modes in the CCS Sensor Interface Unit 102, making it compatible with a variety of conventional activity sensors 103, and displaying status in a simple, intuitive manner. Moreover, because the size and shape of the point of entry to be monitored by the sensors 103 is generally controlled to create predetermined traffic patterns, the sensors 103 and point of entry design can be combined to limit the degree of over- or undercounting reported by reliably producing a sensor output for each customer.

As will be understood upon reading the following description, a fairly low-level security system technician can easily install the CCS Sensor Interface Unit 102 successfully without access to the computer 101. If required, more skilled personnel can finish the job later.

Figure 2:
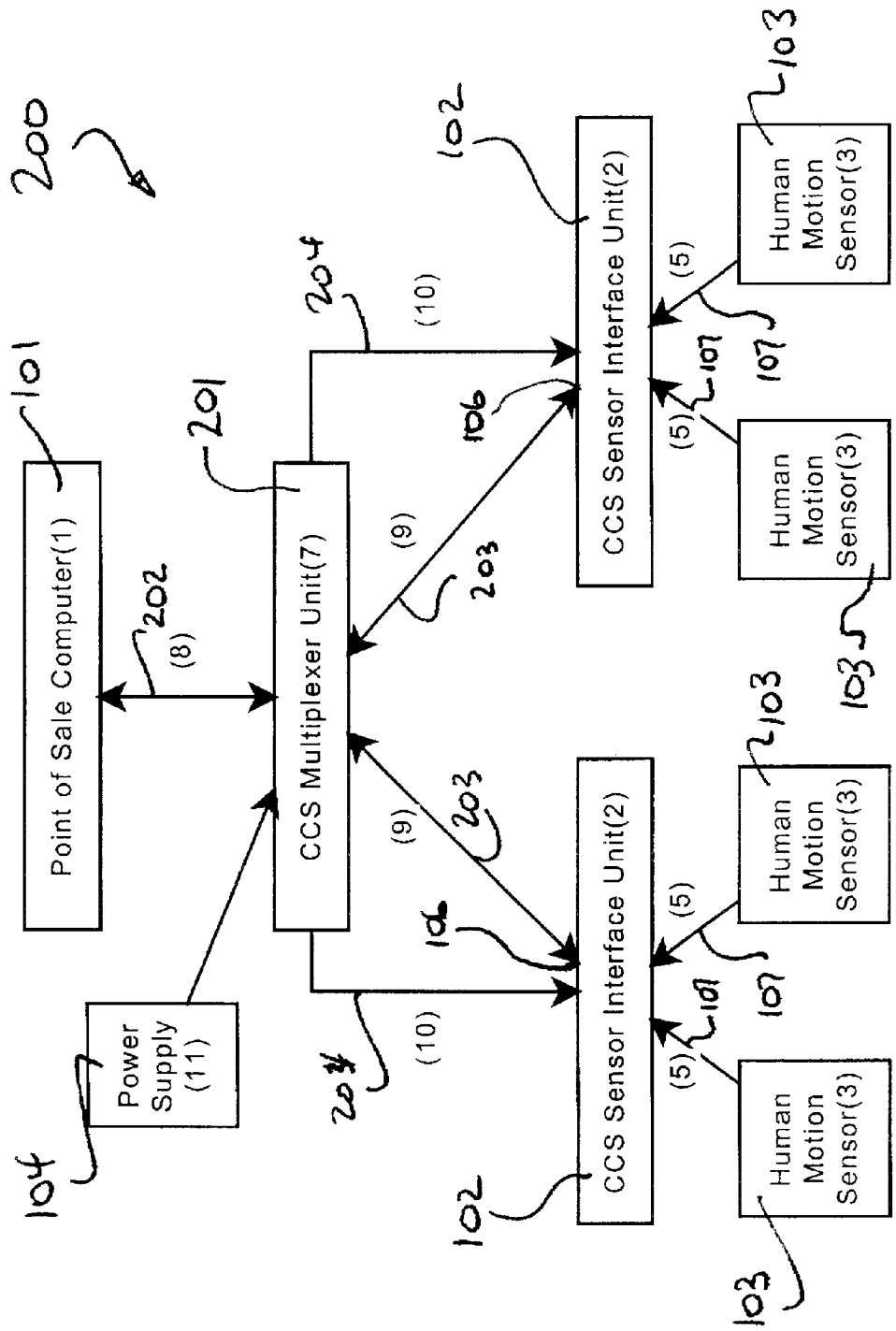
FIG. 2 is a block diagram illustrating an embodiment of another aspect of the invention including a multiplexer.

According to another advantageous aspect, the exemplary system is modular. CCS Sensor Interface Units 102 can be produced at low cost in high volumes. A number of CCS Sensor Interface Units 102 can be multiplexed together when more inputs are required than available in a single unit. A multiplexed system 200, as shown in FIG. 2, may include at least the following:

a Point of Sale (POS) computer or other computer 101;

a CCS Multiplexer 201

2 or more CCS Sensor Interface Units 102; and multiple activity sensors 103.

Also, as explained below, the CCS Sensor Interface Unit 102 can be connected in parallel with sensors that are already attached to an existing store security system.

Figure 1:
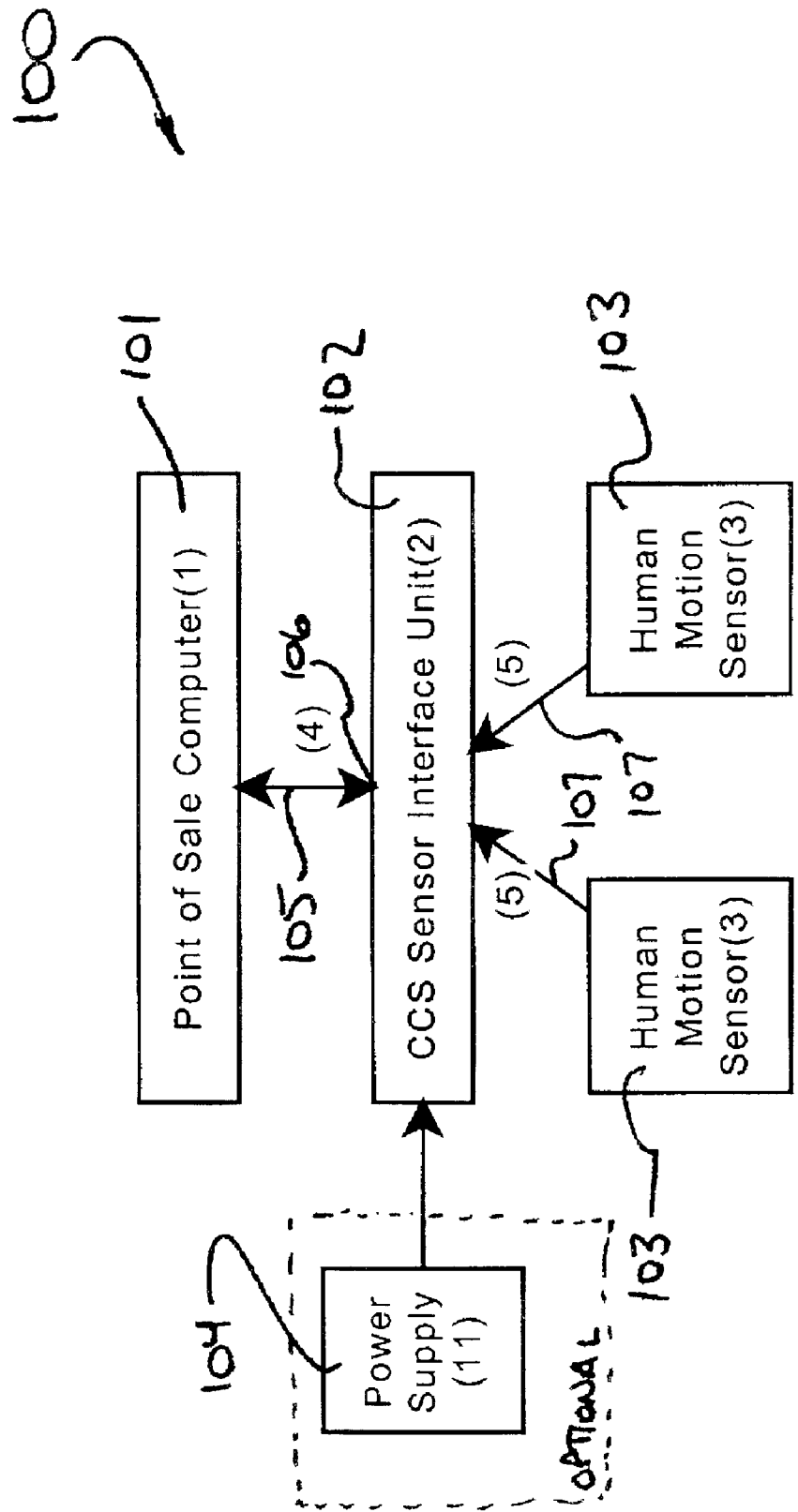
FIG. 1 is a block diagram illustrating an embodiment of one aspect of the invention.

In order to render the following discussion clear, a number of definitions are now given with reference to FIGS. 1 and 2.

Point of Sale (POS) Computer or other Computer 101—This is a computer that monitors a communications medium 105 connecting the POS computer or other computer 101 to the CCS Sensor Interface Unit 102, or a medium 202 connecting the computer 101 to a CCS Multiplexer Unit 201, and records sensor 103 activations during specific time intervals (e.g., 10, 15, 30 and 60 minute intervals). The POS computer may be a computer with the Microsoft Windows operating system, but any computer could be used. Although the following examples refer to a POS computer 101, it will be understood by the skilled artisan that another computer with a real-time clock could also be used.

CCS Sensor Interface Unit 102—This is a specially designed unit that monitors changes in sensors 103 (e.g., switch closure, relay closure or solid state semiconductor signal). This device has a circuit or switch whose position or state defines the sensor 103 polarity (i.e. whether the switch is either normally open or normally closed). This device 102 has indicators that communicate to a person whether the device 102 is working properly or not. This device 102 includes a connection to the communication medium 105 through which a sensor event may be communicated to a computer or a connection to a medium 203 through which a sensor event may be communicated to a computer through a multiplexing device, such as CSS Multiplexer Unit 201 described below.

Human Motion Sensor 103—This part of the system 100 or 200 consists of any type of sensor that can be activated by a human and has a switch contact or solid state output. These will typically be door switches or infrared interrupter switches. The output signal need not be any more sophisticated than a simple binary signal indicating actuation of the sensor.

CCS Communication Interface 106—This is the hardware through which the CCS Sensor Interface Unit 102 communicates with the POS Computer 101 or the CCS Multiplexer Unit 201. The CCS Communication Interface 106 could be one of many different types including, but not limited to: serial, Universal Serial Bus, Ethernet, radio, wireless, telephone/modem, computer parallel port, etc.

Sensor Connection 107—The Human Motion Sensor 103 may be connected to the CCS Sensor Interface Unit 102 via wires, radio link, infrared communications link, or the like.

CCS Multiplexer Unit 201—A CCS Multiplexer Unit 201 may be used when more sensor inputs are needed than any one CCS Sensor Interface Unit 102 can provide. It can communicate with multiple CCS Sensor Interface Units 102 simultaneously. Event data from plural CCS Sensor Interface Units 102 may be passed through a CCS Multiplexer Unit 201 to POS Computer 102.

Multiplexer Communications link to Computer 202—This is a communication medium through which the CCS Multiplexer Unit 201 communicates with the POS Computer 101. This communication link 202 could employ one or more different technologies including, but not limited to: serial, universal serial bus, Ethernet, radio, wireless, telephone/modem., computer parallel port, etc. When the POS Computer 101 is communicating with one or more CCS Sensor Interface Units 102, an addressing protocol is employed to permit the POS Computer 101 to selectively communicate with a particular CCS Sensor Interface Unit 102.

Communications Link from CCS Sensor Interface Unit to CCS Multiplexer Unit 203—This link 203 is functionally the same as the link 105 from the CCS Sensor Interface Unit 102 to the POS computer 101 in systems not using the CCS Multiplexer Unit 201. The CCS Multiplexer Unit 201 is transparent to the CCS Sensor Interface Unit 102 and enables the modular expansion of the system 200.

Multiplexer Power Out 204—The CCS Multiplexer Unit 201 can supply power to the attached CCS Sensor Interface Units 102. This reduces the number of total power supplies required to one, thus reducing cost and the need for multiple AC outlets.

Power Supply 104—This is an external source of power for either the CCS Multiplexer Unit 201 or CCS Sensor Interface Unit 102. This will typically be an off the shelf power supply or could possibly be a battery.

As shown in FIG. 1, a simple installation of the exemplary system 100 includes a point of sale (POS) computer 101, a customer conversion system (CCS) interface unit 102, one or more sensors 103 and optionally an independent power supply 104 for the CCS interface unit 102.

In the illustrated configuration, unit power is provided by power supply 104. When a customer enters an establishment employing the system, the customer activates a sensor 103. Sensor 103 is connected through a communication medium, such as a cable 107 or radio link (not shown) to CCS interface unit 102. CSS interface unit 102 analyzes the activation and immediately sends data through a communication medium 105 to the POS computer 101. The POS computer 101 receives notice of activation and increments its count of customers for the current interval. At the end of each predetermined interval (e.g. 1:30 p.m. for 30 minute intervals), counts for sensors are stored in a computer data file on the POS computer 101 or on a remote computer (not shown) with which the POS computer 101 may communicate from time to time.

Computer 101 may also request diagnostic or status information from the CCS Sensor Interface Unit 102 through communication medium 105. The CCS Sensor Interface Unit 102 will respond with diagnostic data or status.

Figure 3:
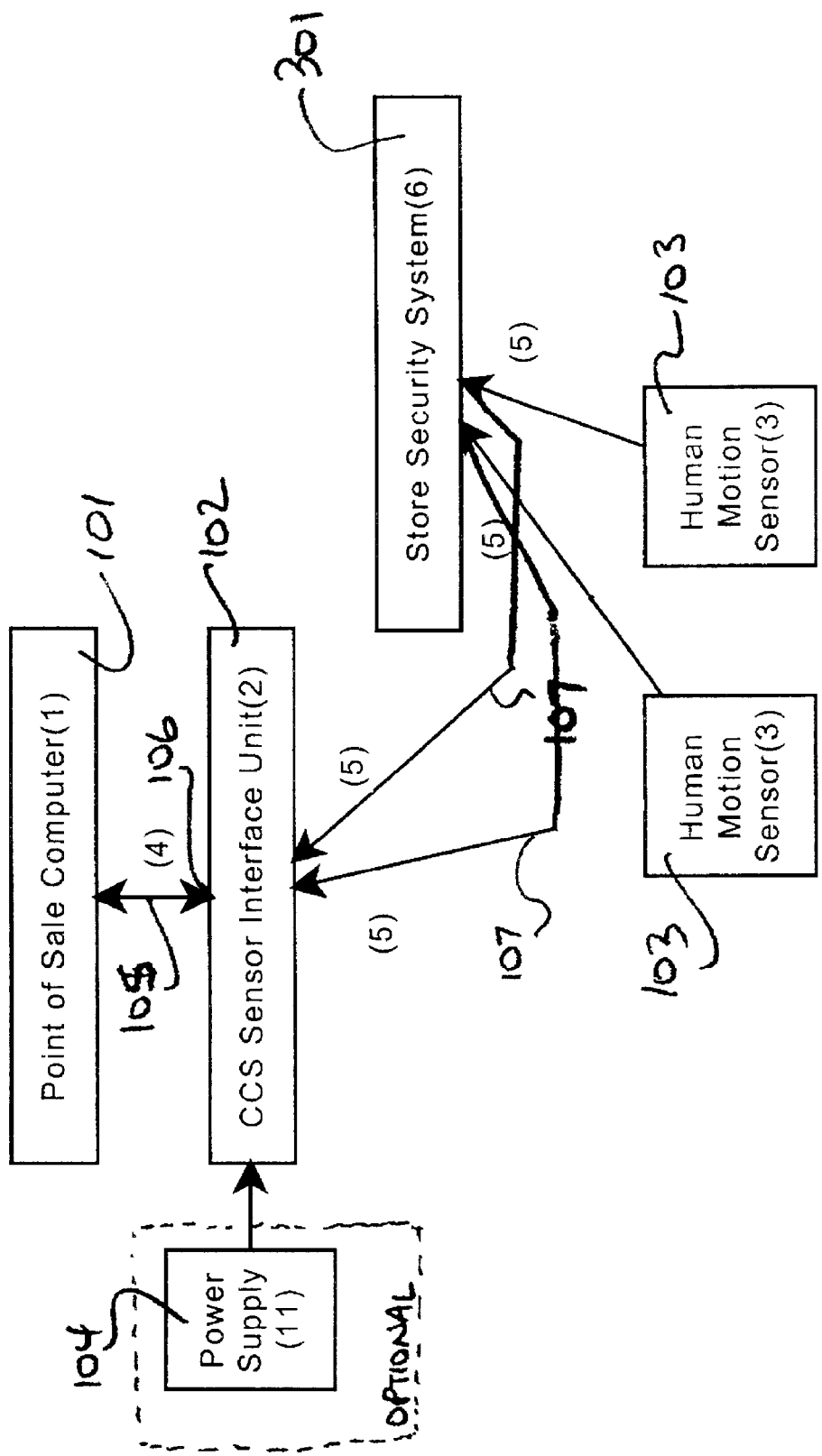
FIG. 3 is a block diagram illustrating an embodiment of the invention integrated with a security system.

As shown in FIG. 3, the system may share sensors 103 with another device or system, such as a security system 301. Unit power can be optionally provided by power supply 104. A customer activates sensors 103. Communication media 107 connect sensors 103 to interface unit 102. Interface unit 102 analyzes the outputs and immediately sends data through communication medium 105 to computer 101. Computer 101 receives the sensor output and increments its count for a current interval. As described above, the end of each interval (e.g., at 1:30 p.m. for 30-minute intervals), counts for sensors are stored in a computer data file.

Also described above, computer 101 may request diagnostic or status information through communication medium 105. CCS Sensor Interface Unit 102 will respond with diagnostic data or status.

This configuration is attractive since extra wiring and sensors are not needed for the CCS. Communication medium 107 can be connected to the sensors 103 at the security system 301 panel, for example.

FIG. 2, mentioned earlier, illustrates an exemplary system 200 that uses two or more CCS interface units 102. A multiplexer 201 is used to communicate data from the computer 101 to plural interface units 102. Multiplexer 201 power may optionally be provided by a local power supply 104 provided for the purpose. Interface unit 102 power may be supplied either through multiplexer 201 or by one or more dedicated power supplies (not shown) provided therefor. In operation, a customer activates one of the sensors 103. Sensor communication media 107 connect the sensors 103 to interface units 102. Interface units 102 analyze signals received over communication media 107 and immediately sends data through communication link 203 to multiplexer 201. Multiplexer 201 immediately forwards data through communication link 202 to computer 101. Computer 101 receives signals indicating that one or more of the sensors have been activated and increments its count of customers for the current interval. At the end of each interval (e.g., at 1:30 p.m. for 30-minute intervals), counts for sensors are stored in a computer data file.

Computer 101 may request diagnostic or status information through communication link 202. Multiplexer 201 will forward such a request through communication link 203 to one or more interface units 102. Interface units 102 may be separately addressable using conventional techniques. An interface unit 102, which has received such a request, will respond with diagnostic data or status through communication link 203 to multiplexer 201. Multiplexer 201 will then forward the diagnostic or status data through communication link 202 and then to computer 101.

Figure 4:
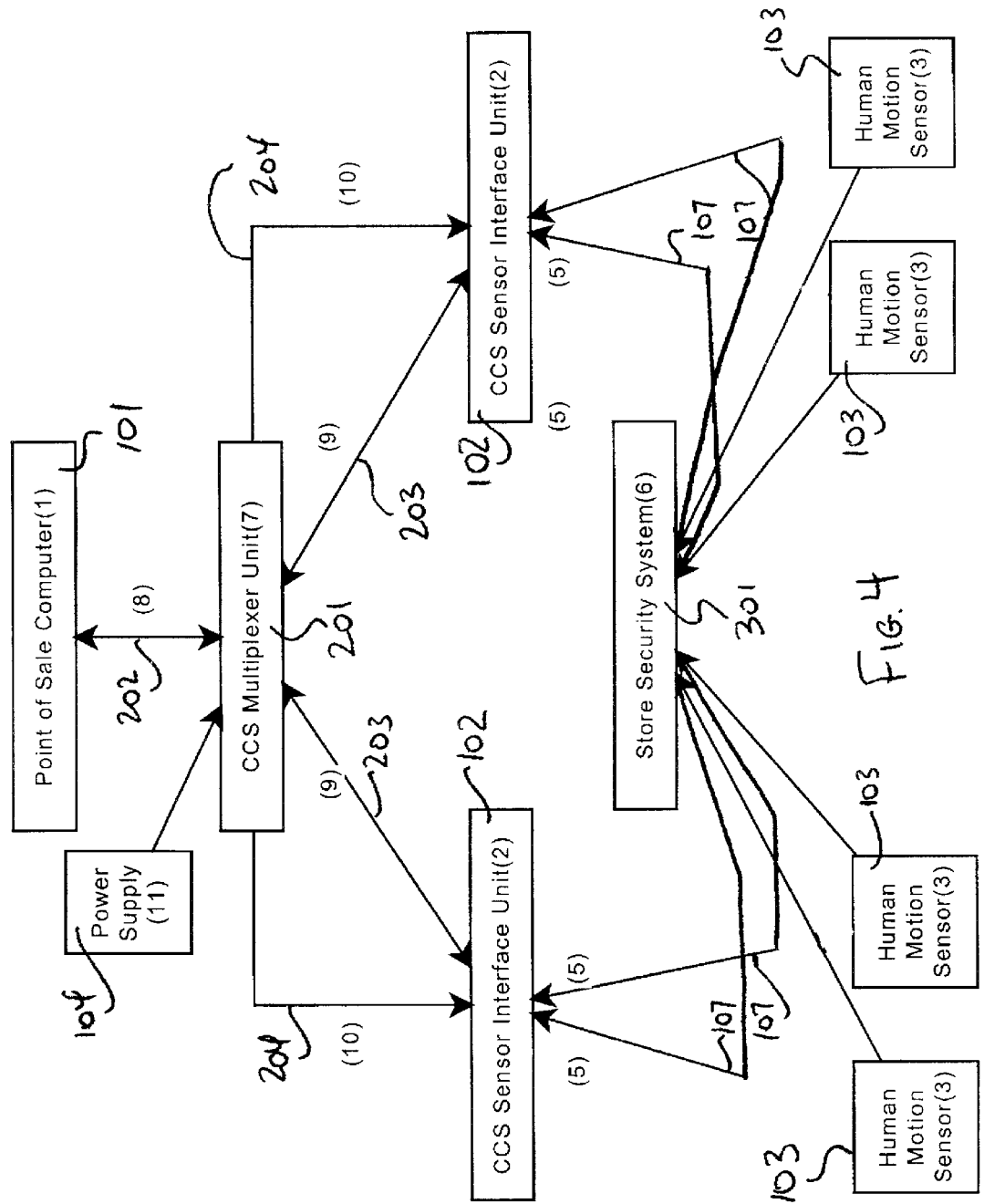
FIG. 4 is a block diagram illustrating an embodiment of another aspect of the invention including a multiplexer and integrated with a security system.

As shown in FIG. 4, a variation of the embodiment of the invention illustrated in FIG. 2 may be arranged such that the sensors 103 are shared with another device or system in a manner similar to that discussed in connection with FIG. 3. The system of FIG. 4 uses two CCS interface units 102 (more are possible) and shares four sensors 103 (more are possible) with another sensing device such as a security system 301. The multiplexer 201 is used to connect the computer 101 to interface units 102. Multiplexer 201 power may be provided by a local power supply 104. Interface power may come from either the multiplexer 201 or from a dedicated power supply (not shown). In operation, a customer activates sensor 103. Sensor communication medium 107 connects activation to interface unit 102. Interface unit 102 analyzes sensor signals received over communication medium 107 and immediately sends data concerning those signals through a communication link 203 to multiplexer 201. Multiplexer 201 then immediately forwards data through communication link 202 to computer 101. When computer 101 receives data indicative of activation of a sensor 103 by a customer, increments its count of customers for the current interval. At the end of each interval (e.g., at 1:30 p.m. for 30-minute intervals), the computer 101 counts for all of the sensors 103 are stored in a computer data file.

Computer 101 may request diagnostic or status information through communication link 202. Multiplexer 201 will forward request through communication link 203 to interface unit 102. Interface unit 102 will respond with diagnostic data or status through communication link 203 to multiplexer 201. Multiplexer 201 will forward diagnostic or status data through communication link 202 to computer 101.

Figure 5:
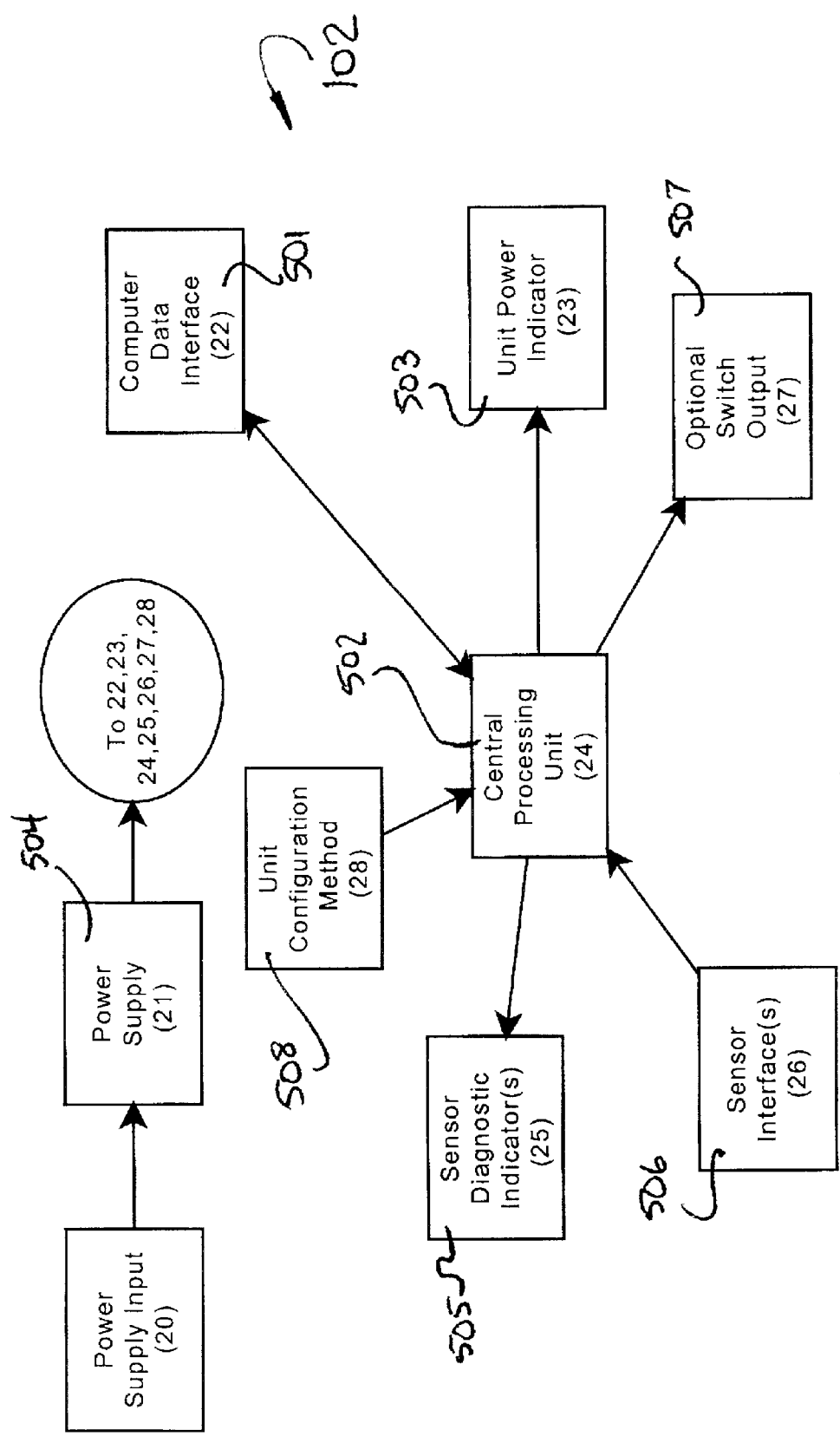
FIG. 5 is a block diagram illustrating a CCS Sensor Interface unit of the embodiments of FIGS. 1–4.

In order to discuss the details of the design of an exemplary CCS interface unit 102, as shown in FIG. 5, several more definitions are useful.

Computer Data Interface 501—This circuit includes devices to convert signals from a central processing unit 502 to be compatible with an external data communications medium. This interface can be either bi-directional or uni-directional.

Unit Power Indicator 503—This is simply a visual or other indicator that relays status of power supply system 504. This may consist of visible displays such as lamps, LEDs, LCDs, or any other visual device that changes state when correct power is applied. The Unit Power Indicator 503 may also be an audible device such as a speaker or electromechanical device such as a meter. The Unit Power Indicator 503 can also indicate correct power by an electrical signal or computer message, which is locally or remotely received and interpreted.

Central Processing Unit 502—A logic chip or chips that monitor and control system functions. The exemplary embodiment uses a single chip microcontroller.

Sensor Diagnostic Indicator 505—This is an indicator that communicates in a human-readable form, status of recent or present sensor activity. This may consist of visible displays such as lamps, LEDs, LCDs, or any other visual device that changes state when sensor activity is detected or sensor error is detected. The Sensor Diagnostic Indicator 505 may also be an audible device such as a speaker or electromechanical device such as a meter. Like the Unit Power Indicator 503, the Sensor Diagnostic Indicator 505 can produce an electrical signal or computer message, which is then converted to human-readable form.

Sensor Interfaces 506—This is the electronic circuitry that is connected to the sensors. The Sensor Interfaces 506 may be designed to detect switch contact closures and openings, solid state signals such as open collector transistors and logic outputs, changes in electrical current, changes in current and/or changes in voltage.

Optional Switch Output 507—This output 507 is used to forward a switch closure to another switch receiving unit. This is useful when using one set of switches with 2 different sensing units.

Unit Configuration Method 508—This is the collection of procedures by which a unit 102 is configured for proper operation. Parameters like switch polarity and sensitivity or switch timing might be set using this method. The method may include manipulating one or more switches that are set to a particular position to signify a particular setting. The method may also manipulate a momentary device like a switch that analyzes a sample switch activation and creates a timing method for monitoring switch during future activations.

Figure 6:
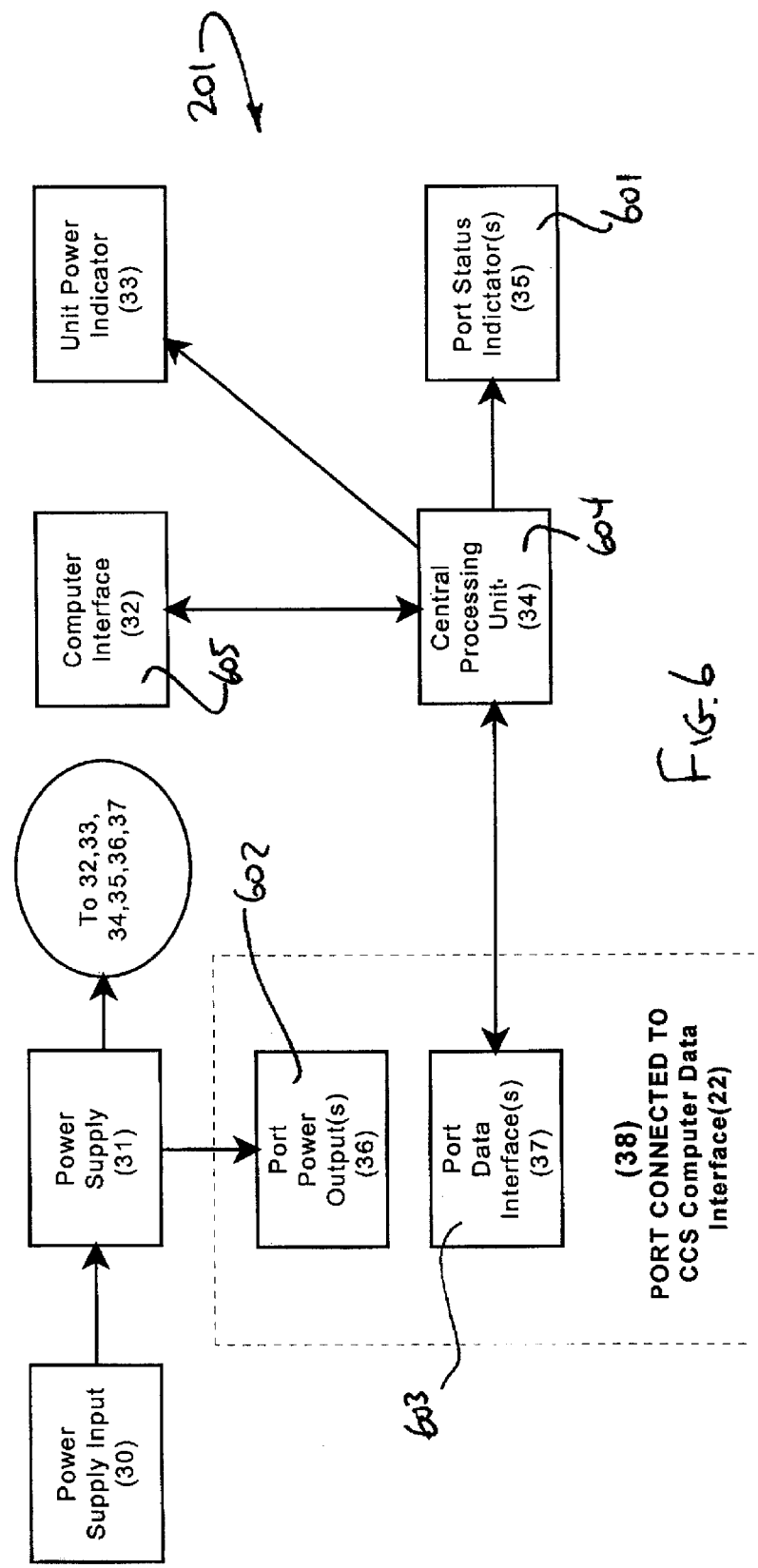
FIG. 6 is a block diagram illustrating a CCS multiplexer of the embodiments of FIGS. 2 and 4.

Some additional definitions relate to the CCS Multiplexer Unit 201 of FIG. 6.

Port Status Indicator 601—The Port Status Indicator 601 communicates in human-readable form, the status of recent or present sensor activity received from interface units. This indicator 601 may consist of visible displays such as lamps, LEDs, LCDs, or any other visual device that changes state when sensor activity is detected or sensor error is detected. Indicator 601 may also be an audible device such as a speaker or electromechanical device such as a meter. This indicator may also produce an electrical signal or computer message which is interpreted either remotely or locally to produce a human-readable output.

Optional Port Power Outputs 602—These outputs can supply power to attached CCS interface units.

Port Data Interfaces 603—These Interfaces 603 include the electronic circuitry necessary to communicate with CCS Interface Units.

An exemplary CCS interface unit 102 is now described in connection with FIG. 5. Unit power is received through input 509. If necessary, power is converted by power supply 504 and provided to sections 501, 502, 503, 505, 506, 507 and 508. Correct power condition is indicated by indicator 503.

On power up, central processing unit 502 initializes its internal registers and prepares for operation. On a continuous or periodic basis, central processing unit 502 performs instructions directing configuration method 508 and sets its monitoring methods according. On a continuous or periodic basis, central processing unit 502 monitors sensor interface 506 for activity. If valid activity is detected, data is sent out or stored that represents a valid activation. Determination of a valid sensor activation may be represented on indicator 505. Optionally, determination of a valid sensor activation may be represented on optional switch output 507.

An exemplary CCS Multiplexer Unit 201 is now described in connection with FIG. 6.

On power up, central processing unit 604 initializes its internal registers and prepares for operation. On a continuous or period basis, central processing unit 604 and optionally communications support circuitry monitor ports 603 for data sent by one of the CCS interface units (FIG. 2, 102). If sensor activation data is received, it is either stored and/or immediately forwarded to computer interface 605. If sensor activation data is received, it may also be represented on indicator 601.

Diagnostic requests can also be received by interface 605. Such requests are then forwarded through port 603. When a response is received through port 603, it is forwarded through interface 605. When a diagnostic request fails to produce a response at port 603, the Central Processing Unit 604 may or may not initiate an error sequence, possibly causing an error code to be transmitted on interface 605.

The exemplary embodiment of the CCS Sensor Interface Unit 102 has two inputs. It is designed to monitor up to two switch type sensors and report activation data to a computer. Other numbers of sensors could be monitored by alternative designs.

The CCS Sensor Interface Unit 102 of FIG. 5 may derive its power from a regulated 12-Volt DC Power Supply 504. The supply 504 may be connected to the Unit 102 by any conventional means, such as a 5.5 mm by 2.1 mm power plug with negative center, or a screw terminal block for hard wiring power to the board when a power plug is not available.

The CCS Sensor Interface Unit 102 will incorporate a RS-232 serial port that is used to upload event and diagnostic data directly to a computer or indirectly through the CCS Multiplexer Unit 201 multiplexer to a computer. These connections have been described above.

Returning to FIG. 5, operation of the CCS Sensor Interface Unit 102 is now described. The exemplary CCS Sensor Interface Unit 102 connects to a computer with the same commercially available cable that is used with modems. Serial communication takes place using the following parameters.

| | |
|---|---|
| Baud Rate: | 1200 bits per second. |
| Data Bits: | 8 |
| Stop Bits: | 1 |
| Parity: | None |

Other types of communication and communication parameters can also be used, if desired.

The CCS Sensor Interface Unit 102 communicates according to the following modes.

Normal Operating Mode

When unit determines that a valid sensor activation has occurred, it will promptly send two data strings out its computer interface port.

The first data string is compatible with a first sensor monitoring application. The string is the same regardless of which sensor was activated and is therefore not capable of providing individual sensor totals.

The second data string is compatible with a proposed second sensor monitoring application. It will provide data that indicates which sensor input received the activation and therefore will facilitate counting of individual sensors.

The first sensor monitoring application ignores the second data string.

The second sensor monitoring application will ignore the first data string and use the second data string.

The CCS Sensor Interface Unit 102 does not have or need a Real Time Clock (RTC) in it. The receiving and collection of the above mentioned data strings is dependent on the monitoring software in the computer and therefore, the CCS Sensor Interface Unit 102 need not possess a time stamping capability. However, it is possible to implement aspects of the invention using a CCS Sensor Interface Unit 102 that does include an RTC that is used to time stamp data.

The data strings are automatically sent out when a valid activation occurs. According to one embodiment, the CCS Sensor Interface Unit 102 is not polled for new activation data by the computer. This eliminates a lot of communication overhead and simplifies the CCS Multiplexer Unit 301. However, in some applications it may be desired to retrieve new activation data by polling one or more CSS Sensor Interface Units 102 connected to the CSS Multiplexer Unit 301 using conventional polling techniques.

Diagnostic Mode

The CCS Sensor Interface Unit 102 accepts requests from the computer for diagnostic status information. A minimum of the following information will be available:

Unit Type: e.g., 2 input or 4 input

Firmware Version: e.g., V 1.0

Mode Switch Settings

Current Sensor State

Fault Condition

During the brief diagnostic data request, switch activation data will not be sent to computer. Switch activations received during the processing of a diagnostic data request may be stored and then sent following the diagnostic sequence, or may simply be discarded, as desired by the designer.

Additional diagnostics may also be implemented.

The CCS Sensor Interface Unit 102 has a sensor interface specified as follows:

Number of Sensor Inputs: 2

Method of Connecting Sensor: 2-wire screw terminal block

Sensor Compatibility: Mechanical switch contact

Sensor Polarity: Can be Normally Open or Normally Closed

The CCS Sensor Interface Unit 102 requires that the sensor must be activated and stable for at least 75 milliseconds to be deemed a valid activation. Such a criterion prevents false activations due to switch bounce. Other times may be used, as required.

Preferably, the total resistance of sensor wire and the active sensor element, for example a switch, should not exceed 100 ohms. Other designs may accommodate greater or lesser sensor resistance values.

The exemplary Unit is designed to operate with switches that are dedicated exclusively to the CCS Sensor Interface Unit 102. However, the skilled artisan will understand that designs are possible which share a sensor with a security system or other equipment, for example.

In order to accommodate a variety of sensor configurations, the exemplary CCS Sensor Interface Unit 102 includes three mode switches. The first mode switch sets compatibility with the sensor polarity. The second two mode switches set sensitivity, as follows.

Sensitivity is defined by a combination of Minimum Switch Activation Time and Minimum Time Between Activations. Minimum Switch Activation Time is the minimum time the switch is active and stable, i.e., not bouncing before being deemed a valid switch activation. Minimum Time Between Activations is the minimum time the switch must be inactive before a new activation will be considered. This filters out extra counts in situations where the sensor is prone to being activated more than once by the same customer. An example of four sensitivity settings possible using two switches is shown in the following table.

| Sensitivity Setting | *Minimum Switch Activation Time (in milliseconds) | *Minimum time between Activations (in milliseconds) |
|---|---|---|
| A | 100 | 250 |
| B | 50 | 100 |
| C | 250 | 250 |
| D | 100 | 100 |

The exemplary CCS Sensor Interface Unit 102 provides visible indicators that are helpful during installation and ongoing troubleshooting of the system. Indicators are visible to the outside of the unit regardless of whether or not the access cover is present.

Some useful diagnostic indicators include power and sensor state. The power indicator simply glows when power is present and correct. The sensor state indicator may indicate a variety of conditions, as follows. During power up, each indicator blinks 3 times. This indicates basic system is operational. Each indicator blinks once for each valid switch activation. Continuous blinking of the indicator shows that a fault condition exists. Blinking stops when the fault condition is corrected. A fault condition is assumed to exist when the sensor is in the activated state for more than 10 seconds. A fault condition will most commonly be caused by a mismatch between the sensor switch type and the Polarity mode switch. Other examples of fault conditions might be an open connection in a Normally Closed configuration or a wire short in a Normally Open configuration. The time duration of the condition deemed a fault may be set at other than 10 seconds.

In operation, any of the embodiments of FIGS. 1–4 cause the POS computer or other computer to receive signals indicating sensor activations. Such sensor activations are stored by the computer, as follows. Each activation may be stored as a record in a computer file together with a time-stamp indicating when it occurred. Alternatively, activations occurring within a defined interval may be tallied up and the total stored as a record in a computer file together with a time-stamp indicating a relevant time, such as when the interval began or ended, or perhaps both. In both cases, a time when an activation occurred is recorded, with varying degrees of time resolution or granularity. Computations can then be performed to obtain, for example, statistical models of relationships between numbers of customers served and numbers or dollar values of sales made.

The present invention has now been illustrated by the foregoing descriptions of several embodiments and aspects thereof. Numerous variations and modifications contemplated as within the invention should now be evident to the skilled artisan. Therefore, the invention is limited only to the scope of the appended claims and equivalents thereto, when properly construed.

What is claimed is:

1. A customer conversion system, comprising:
   a data processing unit including a real-time clock and an input, the data processing unit executing instructions to store information relating data received at the input to an output of the real-time clock;
   a first sensor having an output indicative of each activation of the first sensor; and
   a first modular interface unit having an input connected to the output of the first sensor,
   a communication medium connecting the first interface unit to the input of the data processing unit through the communication port whereby the interface unit produces a data signal at the input of the data processing unit indicating in real-time each activation of the first sensor and the data processing unit executes instructions to relate activation of the first sensor to an output of the real time clock.

2. The system of claim 1, further comprising:
   a software program executing on the data processing unit which performs:
      receiving the output of the first sensor from the interface unit; and
      storing a record of the output of the first sensor together with a time-stamp based on the real-time clock.

3. The system of claim 2, further comprising:
   a security system to which the first sensor output is connected.

4. The system of claim 2, wherein the first interface unit includes circuitry to set the sensitivity.

5. The system of claim 4, wherein the circuit to set sensitivity includes an input to alter minimum switch activation time and an input to control minimum time between activations.

6. The system of claim 1, further comprising:
   a second sensor having an output indicative of each activation thereof;
   a second interface unit having a communication port and a sensor input, the second interface unit connecting the output of the second sensor to the input of the data processing unit; and a multiplexer connected to the communication port of the first interface unit and to the communication port of the second interface unit through which the first interface unit and the second interface unit connect the output of the first sensor and the output of the second sensor to the input of the data processing unit.

7. The system of claim 1, wherein the first interface unit further comprises:

a communication port selected from a serial port, a Universal Serial Bus port, an Ethernet port, a radio link, a wireless link, a modem and a parallel port, the communication port connected to the communication medium.

8. In a retail store including sensors which detect a person and a data processing unit including a real-time clock, a customer conversion system, comprising:

a first interface unit connecting a first one of the sensors to the data processing unit through a communication port connected to a communication medium; and wherein the data processing unit comprises a point of sale computer in the retail store, the system further comprising a software program executing on the data processing unit directing the data processing unit to:

receive in real-time a signal from the sensor through the interface unit, the signal indicating in real-time detection of a person by the sensor, time-stamp the signal with a time determined from the real-time clock of the data processing unit, store a record of receipt of the signal together with the time-stamp indicating when the signal was received.

9. The system of claim 8, further comprising:

in the software program executing on the data processing unit, directing the data processing unit to:

generate the time-stamp based on a current value obtained from the real-time clock.

10. The system of claim 9, wherein the interface unit includes circuitry to set sensitivity.

11. The system of claim 9, wherein storing further comprises:

including in the record the time-stamp indicating a time interval and a count of activation that occurred during the time interval.

12. The system of claim 8, further comprising:

a second one of the sensors;

a second interface unit connecting the second one of the sensors to the data processing unit; and a multiplexer through which the first interface unit and the second interface unit connect the first one of the sensors and the second one of the sensors to the data processing unit.

13. The system of claim 12, further comprising:

in the software program executing on the data processing unit, directing the data processing unit to:

generate the time-stamp based on a current value obtained from the real-time clock.

14. The system of claim 13, wherein storing further comprises:

including in the record the time-stamp indicating a time at which the activation occurred.

15. The system of claim 13, wherein storing further comprises:

including in the record the time-stamp indicating a time interval and a count of activation that occurred during the time interval.

16. The system of claim 8, the first one of the sensors further comprising:

an alarm system compatible output connected to the first interface unit.

17. A computer interface product, comprising:

an interface unit including:

a first sensor input constructed and adapted to connect to a sensor having an output indicative of each activation of the sensor, and a communication port constructed and adapted to connect to a computer outside the interface product, the communication port carrying a signal indicative in real time of each activation of the sensor; and a machine readable medium carrying a sequence of instructions for execution by the computer, the sequence of instructions defining a method for the computer to communicate with the interface product including:

receiving the signal from the communication port, relating activities to a time generated by a real-time clock in the computer, and storing data indicative of activations of the sensor derived from the signals received and of the time related.

18. The system of claim 17, wherein relating further comprises defining the time generated as an interval having a start time and an end time.

19. The system of claim 17, wherein relating further comprises defining the time generated as a time at which the activation occurred.

20. The system of claim 17, the first sensor input further comprising:

a connector compatible with an entry alarm sensor connected to an entry alarm system; and a circuit adapted to receive an entry alarm sensor output without disrupting the entry alarm system.

21. The system of claim 20, the circuit further comprising:

an adjustment circuit by which parameters are set to provide compatibility with the entry alarm sensor output.

22. The system of claim 21, the adjustment circuit further comprising:

a sensitivity adjustment that varies a minimum sensor activation time and a minimum sensor activation interval in tandem.

* * * * *